(12) United States Patent
Zhou et al.

(10) Patent No.: US 12,431,538 B2
(45) Date of Patent: Sep. 30, 2025

(54) AUTOMATIC MULTI-SURFACE JET PRINTING METHOD FOR POWER LITHIUM BATTERY

(71) Applicant: GUANGDONG CLIMAX SMARTECH CO., LTD, Zhuhai (CN)

(72) Inventors: Wancheng Zhou, Zhuhai (CN); Zhenhui Liang, Zhuhai (CN)

(73) Assignee: GUANGDONG CLIMAX SMARTECH CO., LTD, Zhuhai (CN)

( * ) Notice: Subject to any disclaimer, the term of this patent is extended or adjusted under 35 U.S.C. 154(b) by 0 days.

(21) Appl. No.: 18/955,193

(22) Filed: Nov. 21, 2024

(65) Prior Publication Data

US 2025/0087757 A1    Mar. 13, 2025

Related U.S. Application Data

(63) Continuation of application No. PCT/CN2023/112175, filed on Aug. 10, 2023.

(30) Foreign Application Priority Data

Jun. 5, 2023 (CN) .......................... 202310659989.6

(51) Int. Cl.
  *H01M 10/058* (2010.01)
  *H01M 10/052* (2010.01)
(52) U.S. Cl.
  CPC ....... *H01M 10/058* (2013.01); *H01M 10/052* (2013.01)
(58) Field of Classification Search
  CPC ...... H01M 10/058; B41F 19/007; B41F 15/12
  See application file for complete search history.

(56) References Cited

U.S. PATENT DOCUMENTS 8,995,022 B1    3/2015    Vronsky

FOREIGN PATENT DOCUMENTS

| CN | 108511807 A | 9/2018 |
|---|---|---|
| CN | 108557409 A | 9/2018 |
| CN | 108608725 A | 10/2018 |
| CN | 111036473 A | 4/2020 |
| CN | 214606624 U | 11/2021 |

(Continued)

OTHER PUBLICATIONS

Wu Zhonghai "Full-Automatic Closed Electro-Static Power Spraying Apparat" Coatings Industry, Issue 02, Feb. 29, 1992 (Feb. 29, 1992), pp. 26-28.

*Primary Examiner* — Stephan J Essex
(74) *Attorney, Agent, or Firm* — JEEN IP LAW, LLC

(57) ABSTRACT

The present invention relates to the technical field of jet printing of power lithium battery and discloses an automatic multi-surface jet printing method for power lithium battery, comprising: S1: placing the power lithium battery to be jet printed at the fixture; S2: placing the fixture inside the jet printer; S3: transporting the fixture to jet printing station by the feeding component; S4: jacking component jacks up the fixture, and controls the jacking stroke of the fixture along with detecting component; S5: jet printing the surface of power lithium battery to be jet printed by using the jet printing component; S6: transferring the power lithium battery to the curing station by the feeding component; S7: jacking component jacks up the fixture, and controls the jacking stroke of the fixture along with detecting component; S8: air drying the power lithium battery by the curing component.

6 Claims, 11 Drawing Sheets

(56) References Cited

FOREIGN PATENT DOCUMENTS

| | | |
|---|---|---|
| CN | 214646931 | 11/2021 |
| CN | 215204106 U | 12/2021 |
| CN | 114312047 B | 4/2022 |
| CN | 114701259 A | 7/2022 |
| CN | 114953775 A | 8/2022 |
| CN | 217197502 U | 8/2022 |
| CN | 115106601 B | 9/2022 |
| CN | 217373932 U | 9/2022 |
| CN | 217753238 U | 11/2022 |
| KR | 102441179 B1 | 9/2022 |
| WO | 2017012231 A1 | 1/2017 |
| WO | 2017203022 A1 | 11/2017 |
| WO | 2018024707 A1 | 2/2018 | ns
AUTOMATIC MULTI-SURFACE JET PRINTING METHOD FOR POWER LITHIUM BATTERY

CROSS-REFERENCE TO RELATED APPLICATIONS

This application is a continuation of International Application No. PCT/CN2023/112175, filed on Aug. 10, 2023, which claims priority to Chinese Patent Application No. 202310659989.6, filed with the China National Intellectual Property Administration on Jun. 5, 2023, both of which are hereby incorporated by reference in their entireties.

TECHNICAL FIELD

The present invention relates to the field of jet printing technology for power lithium battery, particularly to an automatic multi-surface jet printing method for power lithium battery.

BACKGROUND

Power lithium battery is a new type of high-energy battery with advantages such as high energy, high battery voltage, wide operating temperature range, and long storage life. With the continuous development of new energy technology, power lithium batteries with increasingly mature battery technology are widely applied in the new energy industry. The most common application in the civilian industry is that, in the field of new energy vehicle, electric vehicles are powered by power lithium batteries to reduce carbon emissions and realize energy conservation and emission reduction.

In the production process of power lithium batteries, the outer shell of power lithium battery has to be wrapped with insulation. In most existing technologies, the outer shell of power lithium battery is wrapped with insulation film manually or mechanically and, during the wrapping process, the insulation film is readily cut by the corners of power lithium battery, or torn during transportation and storage due to the protruded corners caused by wrapping process, which ultimately leads to the exposure of outer shell of the power lithium battery and risks to the use of power lithium battery. Improvements are therefore must be made.

SUMMARY

The main purpose of the present invention is to propose an automatic multi-surface jet printing method for power lithium battery, providing a jet printing method for insulation layer on the outer shell of power lithium battery, and avoiding the risk of battery exposure during transportation, storage, and use.

To achieve the above purpose, the present invention proposes an automatic multi-surface jet printing method for power lithium battery, comprising:
 S1: The operator places the power lithium battery to be jet printed on the fixture, with the side to be jet printed of power lithium battery facing upwards;
 S2: The operator places the fixture holding the power lithium battery to be jet printed inside the jet printer from the feeding port;
 S3: The feeding component disposed at the jet printer transports the fixture to the jet printing station;
 S4: The jacking component disposed at the jet printer jacks up the fixture located at the jet printing station, and controls the jacking stroke of the fixture along with detecting component, in order to adjust the distance between the surface of power lithium battery to be jet printed and the jet printing component;
 S5: Jet printing component starts jet printing on the surface of power lithium battery to be jet printed;
 S6: Feeding component transfers the power lithium battery that has been jet printed to the curing station;
 S7: The jacking component disposed at jet printer jacks up the fixture located at the curing station, and controls the jacking stroke of fixture along with detecting component, in order to adjust the distance between the power lithium battery and the curing component;
 S8: Air dry the side of power lithium battery that has been jet printed in S5 using the curing component;
 S9: Feeding component transfers the power lithium battery that has been air dried to the end of feeding component;
 S10: The returning component located at the end of feeding component transfers the fixture to the circulating component;
 S11: Returning component transfers the fixture to the feeding port;
 S12: The operator retrieves the fixture, takes out the power lithium battery from the fixture, or flips and clamps the power lithium battery for jet printing again.

Specifically, the fixture comprises a bottom plate, and a turning block component is provided at the bottom plate for fixing the lithium battery, the turning block component comprises a plurality of blocking members, each of blocking members is provided with an accommodating groove for contacting the lithium battery, the accommodating groove is provided with a first contact surface, a second contact surface, and a third contact surface that respectively contact different surfaces of the lithium battery, scratch-resistant balls facing the accommodating groove are provided at the first contact surface, the second contact surface, and the third contact surface.

Specifically, the feeding component comprises at least three feeding racks that are arranged in parallel with each other, a feeding belt and a feeding motor are installed at the feeding racks, a material belt groove is also provided at the feeding rack, and a feeding drive wheel is provided at the end of material belt groove, the two ends of the feeding belt are respectively sleeved on the feeding drive wheel, and the driving shaft end of feeding motor is connected to the feeding drive wheel located at one end of the material belt groove.

Specifically, the returning component comprises at least three parallel returning racks that are located directly below the feeding rack, a returning belt and a returning motor are provided at the returning rack, and a returning drive wheel is provided at the end of a returning groove at the returning rack, and the two ends of the returning belt are respectively sleeved on the returning drive wheel, and the drive shaft end of returning motor is connected to the returning drive wheel located at one end of the returning groove.

Specifically, the circulating component comprises a circulating rack and a circulating base, and the circulating rack is disposed at the ends of feeding component and returning component, and the first circulating driving member that is disposed at circulating rack is connected to the circulating base and drives the circulating base to move back and forth between feeding component and returning component.

Specifically, the first circulating driving member comprises a first circulating driving motor, a first circulating screw, and a first circulating shaft sleeve sleeved on the first circulating screw, the motor shaft end of the first circulating driving motor is connected to the first circulating screw, the circulating base is connected to the first circulating shaft sleeve, the circulating base is rectangular, and a circulating groove having the same feeding direction as the feeding component is provided at the circulating base, the front and rear ends of circulating groove are respectively provided with circulating driving wheels where circulating belts are provided, a second circulating driving motor is also provided at the circulating base, and the motor shaft end of second circulating driving motor is connected to the circulating driving wheel.

Specifically, the jet printing component comprises a jet printing rack, a jet printing base, and a jet printing driving member, and the jet printing rack is horizontally disposed above the feeding component, and a UV digital inkjet head is provided at the jet printing base and faces towards the feeding component, and the jet printing driving member is disposed at the jet printing rack and is connected to the jet printing base.

Specifically, the curing component comprises a curing rack, a curing base, and a curing driving member, the curing rack is horizontally disposed above the feeding component, and a curing irradiation port is provided at the curing base and faces towards the feeding component, and the curing driving member is disposed at the curing rack and is connected to the curing base.

Specifically, the jacking component comprises a jacking installation plate, a jacking cylinder, and a jacking support plate, the jacking installation plate is connected to the feeding component, the feeding support plate is disposed above the jacking installation plate, the jacking cylinder is disposed at the jacking installation plate and is connected to the jacking support plate, while driving the jacking support plate to move in the vertical direction.

Specifically, the detecting component comprises CCD detection cameras that are respectively disposed above jet printing station and curing station for detecting the distance between the power lithium battery and the jet printing component or curing component.

Specifically, the detecting component comprises CCD detection cameras that are respectively disposed above jet printing station and curing station for detecting the distance between the power lithium battery and the jet printing component or curing component.

In the technical solution of the present invention, the operator clamps, flips, and removes the power lithium battery, places or removes the power lithium battery at the feeding port, and jet prints the power lithium battery using a jet printer, such that the outer surface of power lithium battery is uniformly coated with a layer of insulating material, and the outer shell of power lithium battery is efficiently wrapped with insulation, avoiding the risk of exposed outer shell of power lithium battery during transportation, storage, and use.

Markings in the attached diagram include: 10. Feeding component; 11. Feeding rack; 12. Feeding belt; 13. Feeding motor; 14. material belt groove; 15. Feeding driving roller; 20. Circulating component; 21. Circulating rack; 22. Circulating base; 23. First circulating driving motor; 24. Circulating driving roller; 25. Second circulating driving motor; 26. Circulating gear chain; 30. Returning component; 31. Returning rack; 32. Returning belt; 33. Returning motor; 34. Returning groove; 35. Returning driving roller; 40. Jet printing component; 41. Jet printing rack; 42. Jet printing base; 43. Jet printing driving member; 50. Curing component; 51. Curing rack; 52. Curing base; 53. Curing driving component; 60. Jacking component; 61. Jacking installation plate; 62. Jacking cylinder; 63. Jacking support plate; 70. Rack; 71. Feed inlet; 80. Fixture; 81. First contact surface; 82. Second contact surface; 83. Third contact surface; 84. Scratch-resistant ball; 85. Accommodating groove; 86. Turning block component; 90. Power lithium battery.

DESCRIPTION OF EMBODIMENTS

The technical solutions in the embodiments of the present invention will be described clearly and completely in conjunction with the accompanying drawings of the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

It should be noted that all directional indicators (such as up, down, left, right, front, back, top, bottom, inside, outside, vertical, horizontal, vertical, counterclockwise, clockwise, circumferential, radial, axial . . . ) in the embodiments of the present invention are only used to explain the relative position relationship and movement among various components in a particular posture (as shown in the accompanying drawings), and if that particular posture is changed, the directional indications will change accordingly.

In addition, descriptions involving terms "first," "second" and the like, if any, in the present invention are only for illustrative purposes and cannot be understood as indicating or implying relative importance or the number of features referred to. Therefore, the features defined with "first" and "second" may explicitly or implicitly include at least one or a plurality of the features. At the same time, the technical solutions of various embodiments can be combined with each other, but must be based on what those of ordinary skill in the art can achieve. The combination of technical solutions that result in contradiction or make it impossible to implement should be considered non-existent, and accordingly should not fall within the scope of protection required by this present invention.

Figure 1:
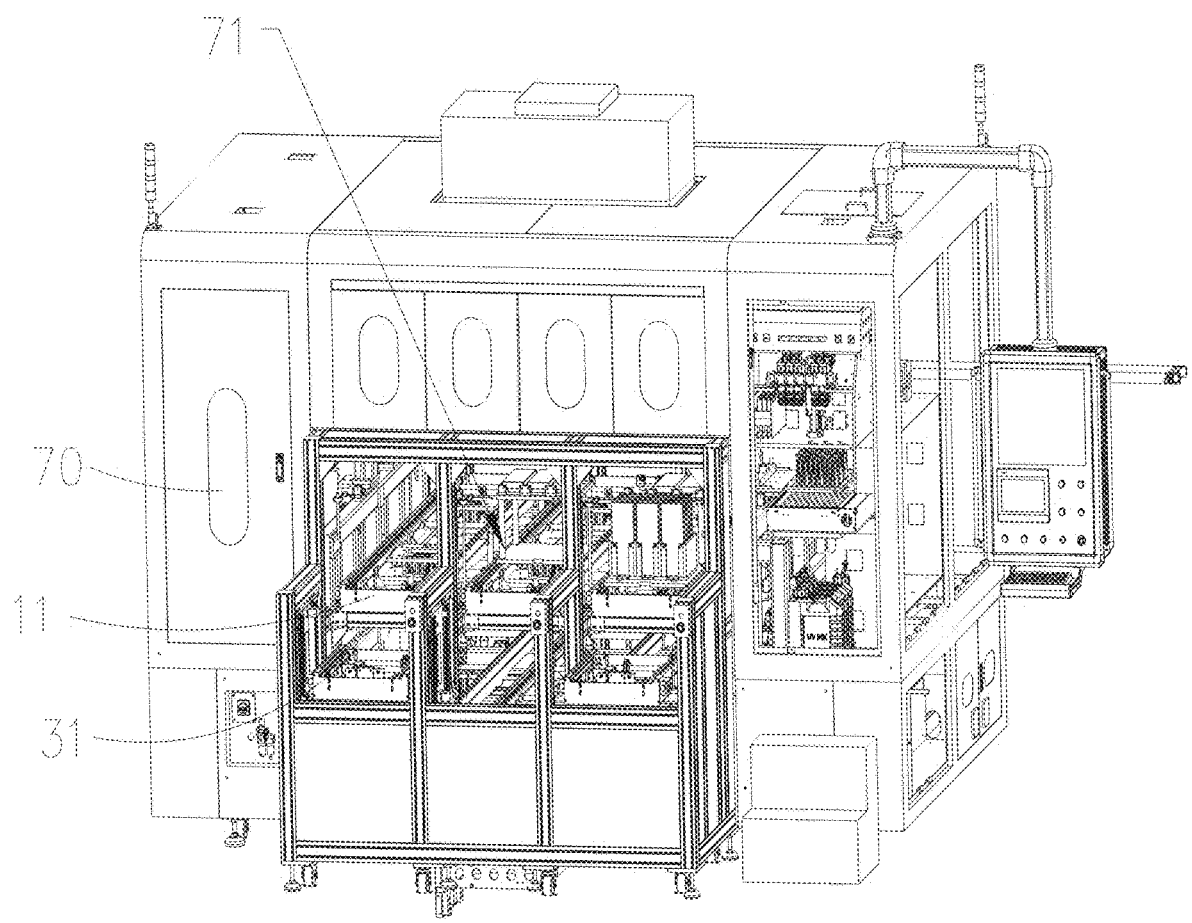
FIG. 1 is the first schematic diagram of 3D structure of the present invention.
Figure 2:
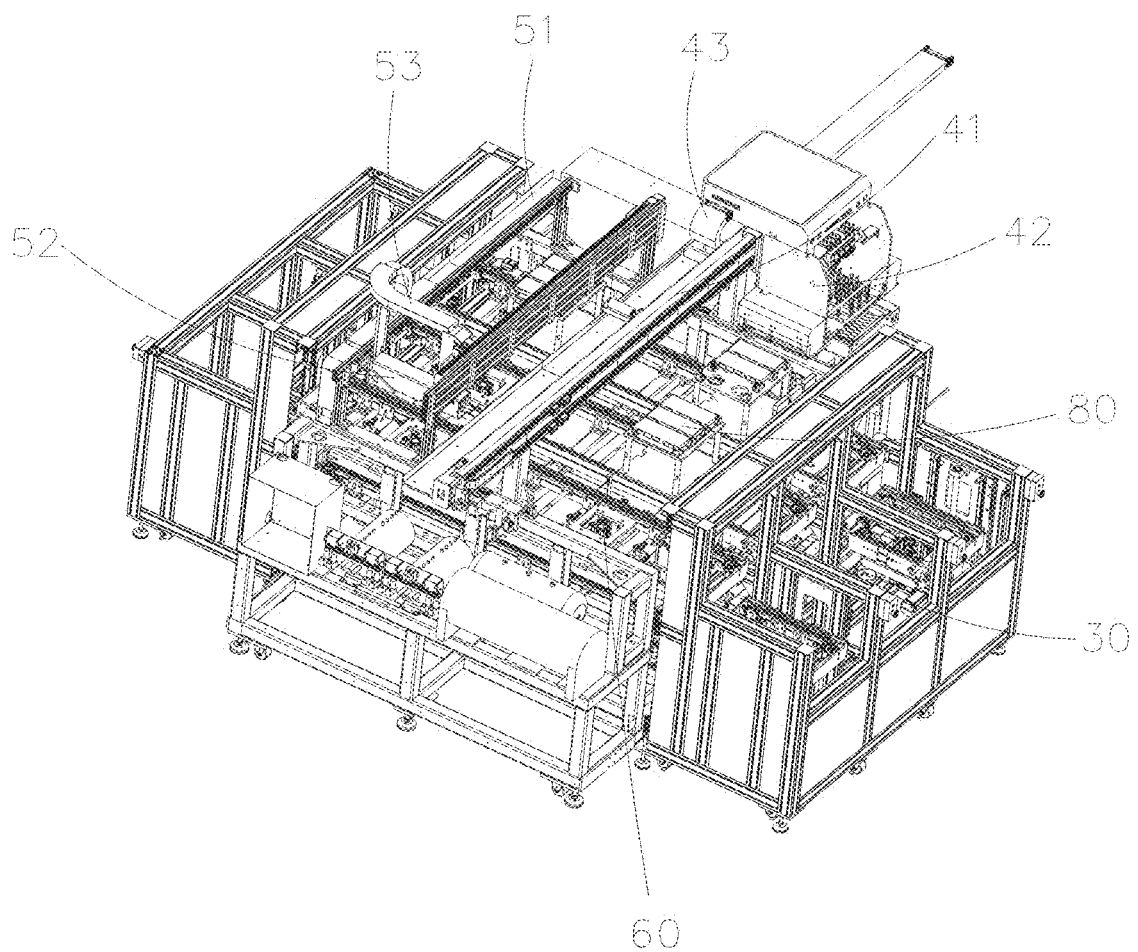
FIG. 2 is the second schematic diagram of 3D structure of the present invention.
Figure 3:
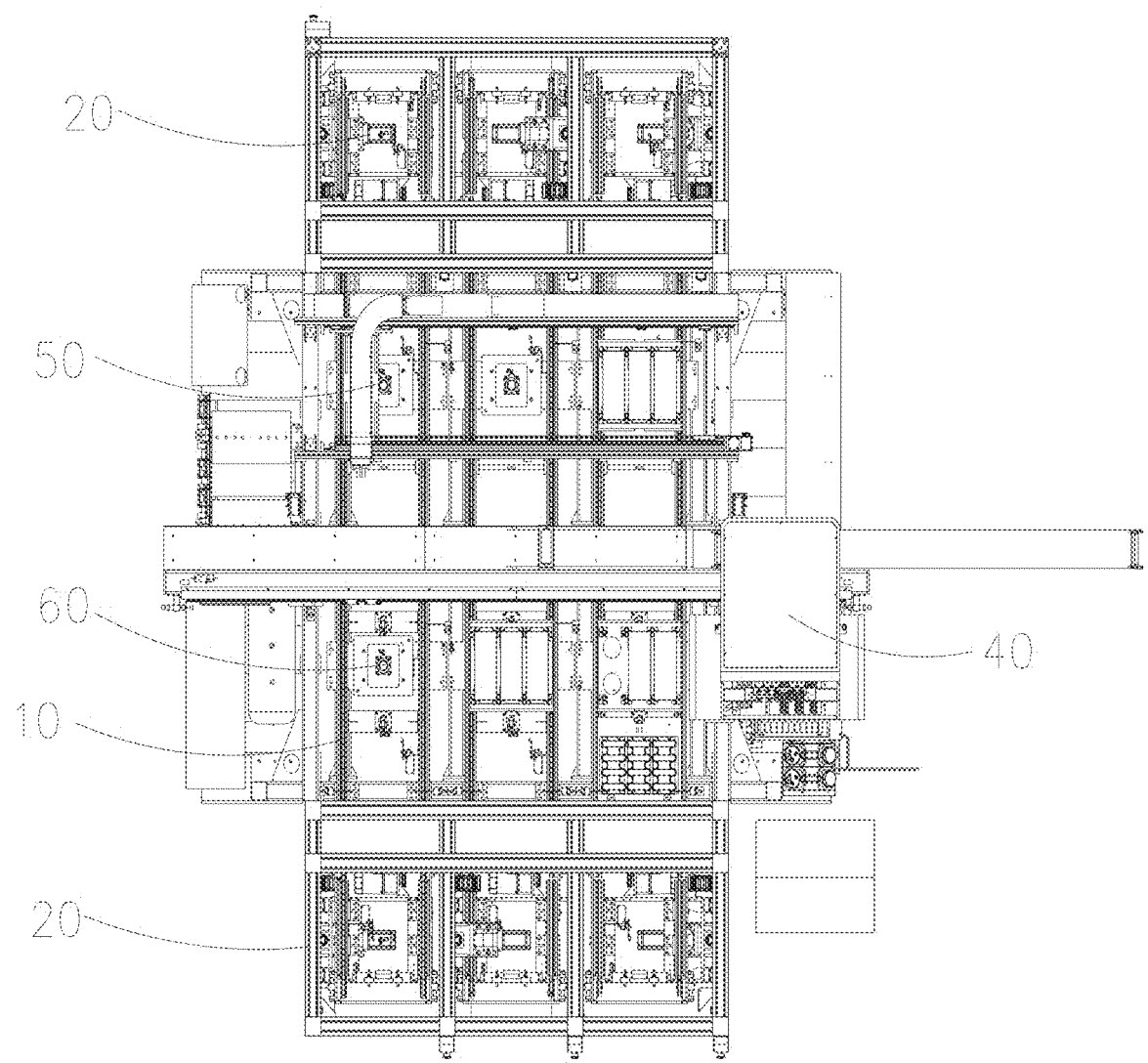
FIG. 3 is the third schematic diagram of 3D structure of the present invention.
Figure 4:
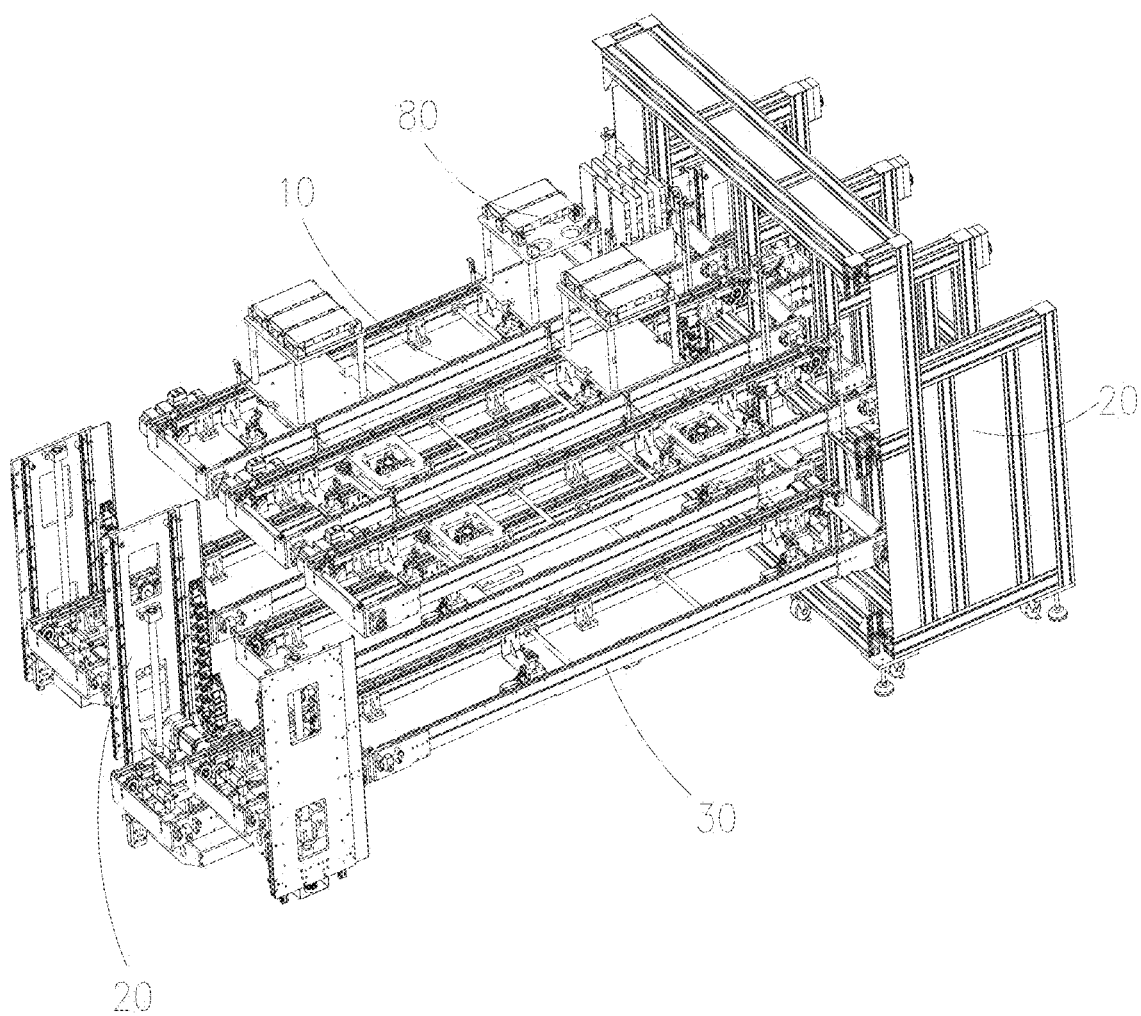
FIG. 4 is the fourth schematic diagram of 3D structure of the present invention.
Figure 5:
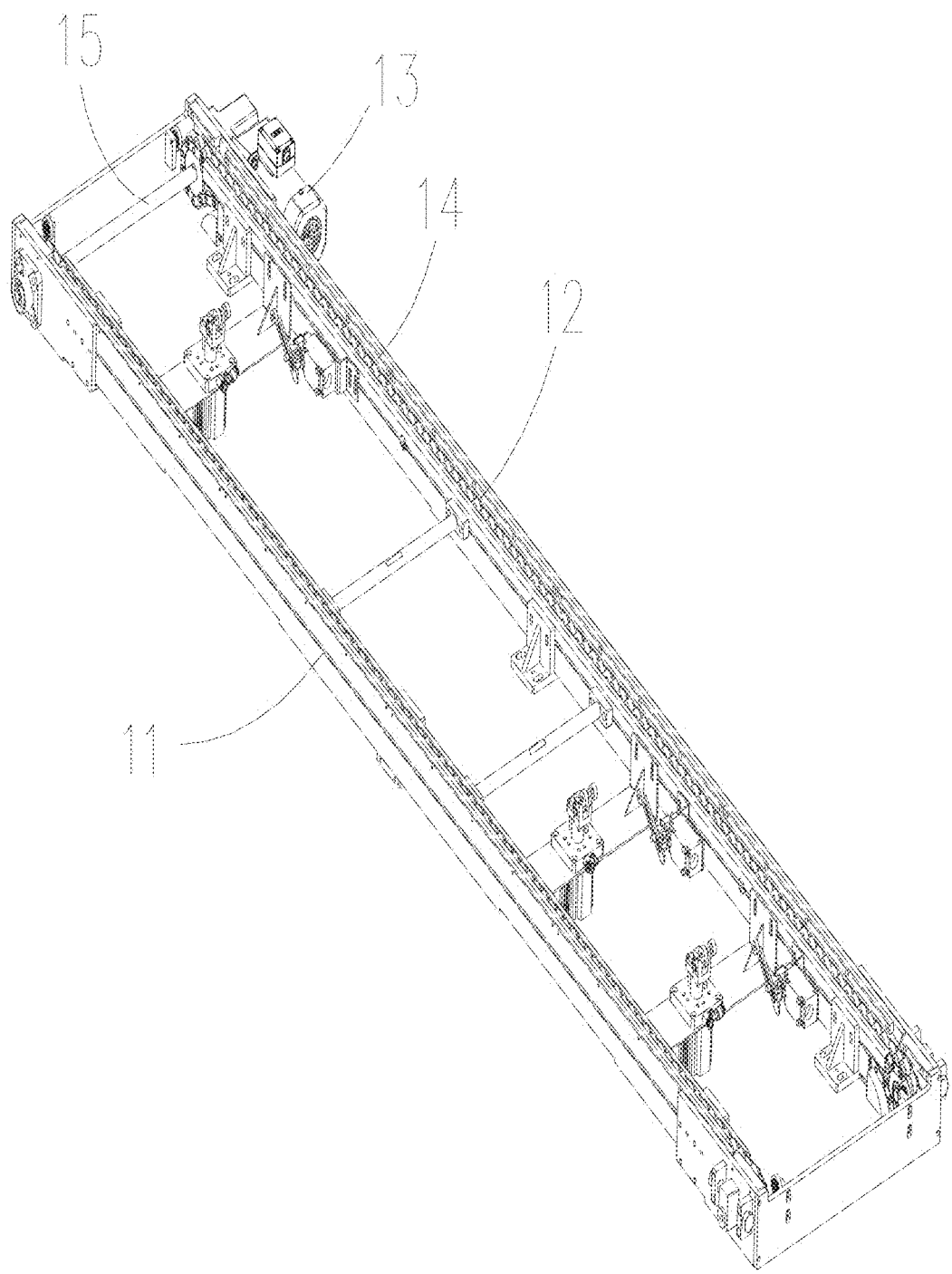
FIG. 5 is a structure diagram of the feeding component of the present invention.
Figure 6:
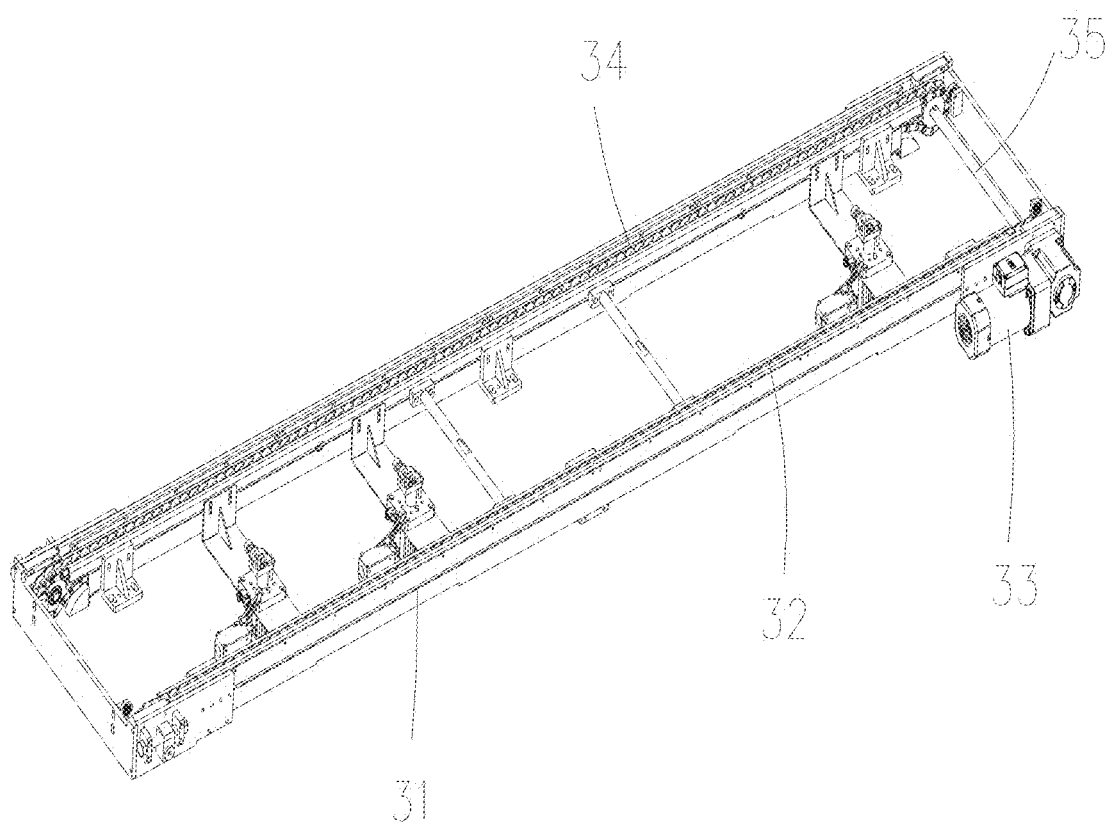
FIG. 6 is a structure diagram of the returning component of the present invention.
Figure 7:
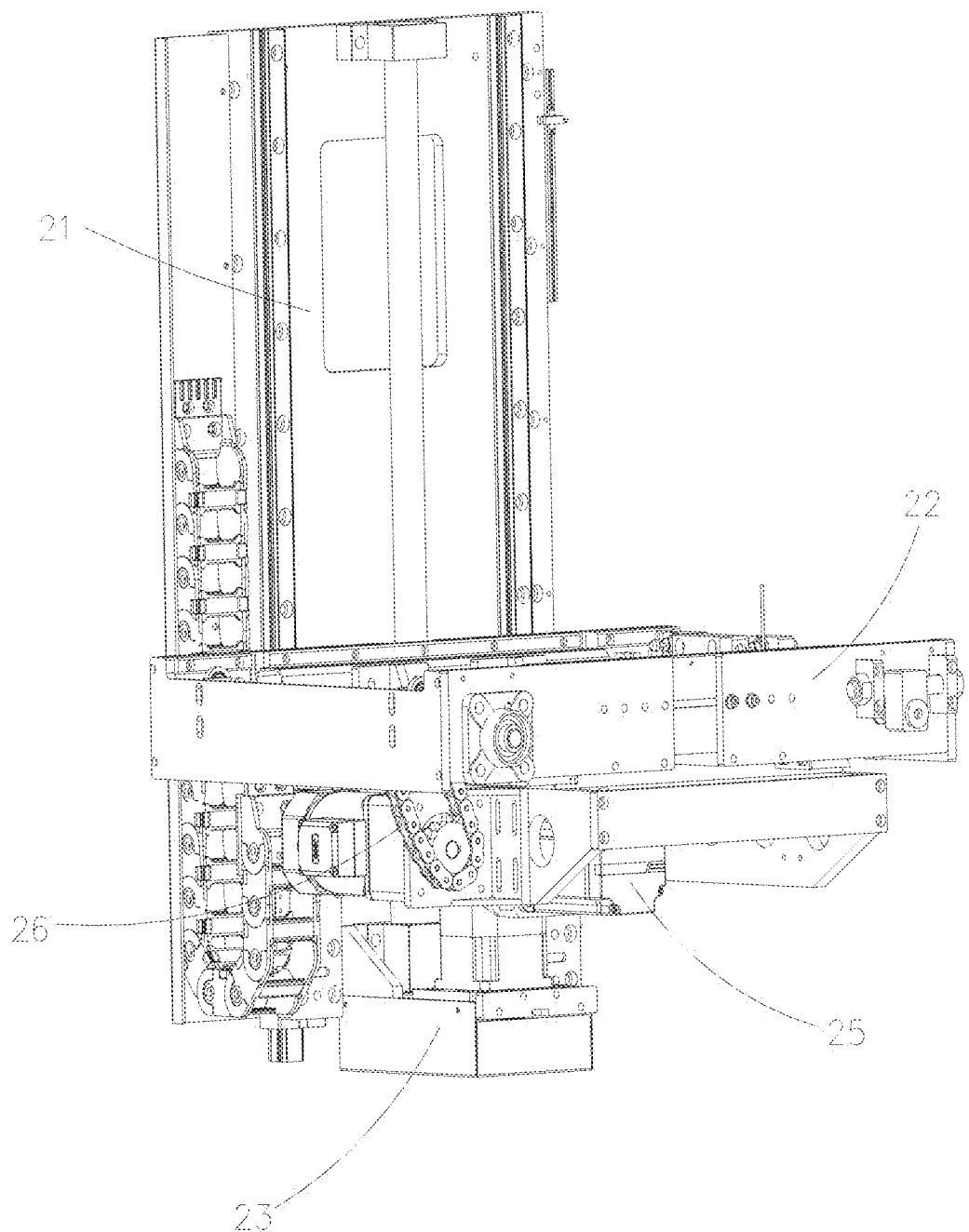
FIG. 7 is the first structure diagram of the circulating component of the present invention.
Figure 8:
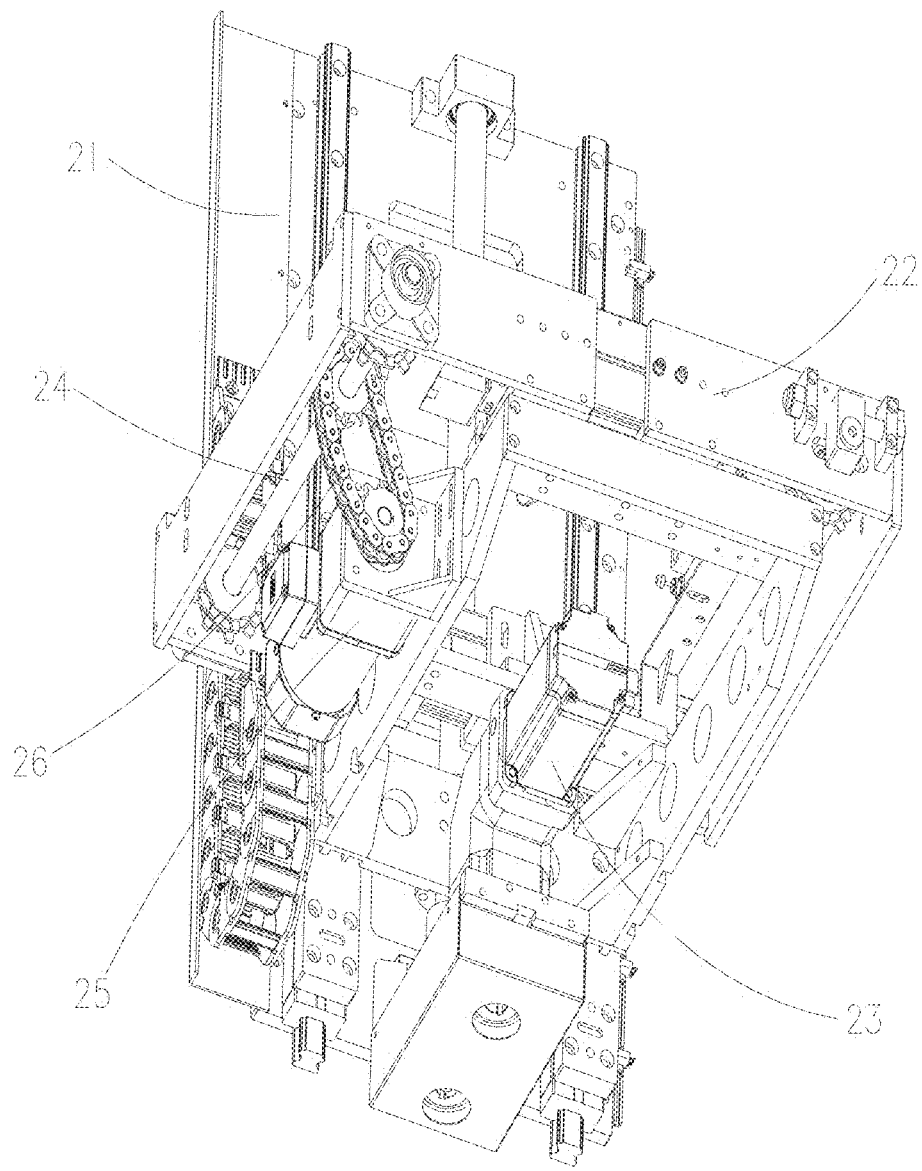
FIG. 8 is the second structure diagram of the circulating component of the present invention.
Figure 9:
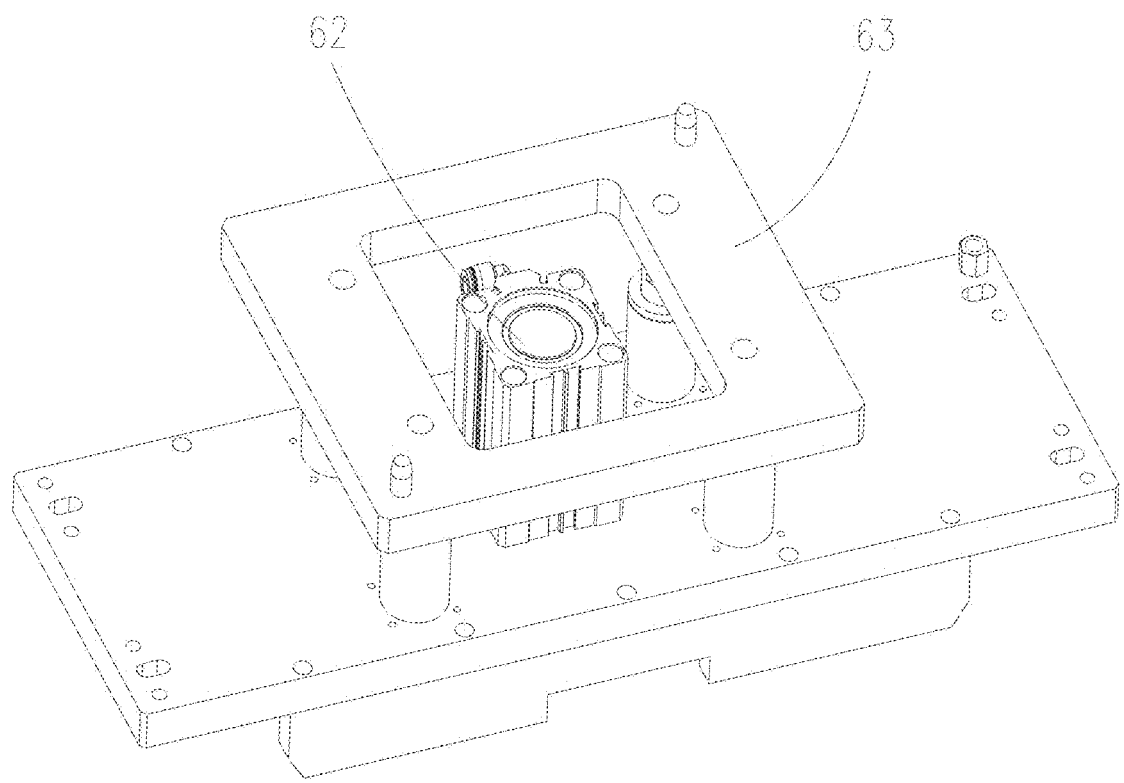
FIG. 9 is the first structure diagram of the jacking component of the present invention.
Figure 10:
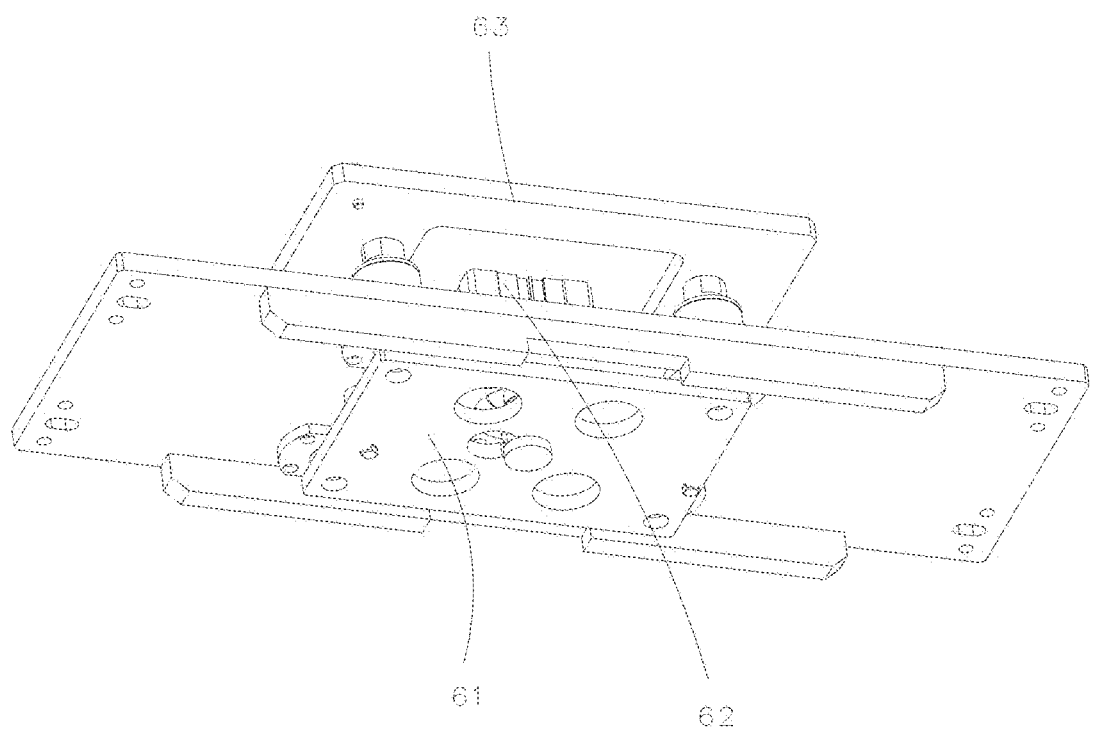
FIG. 10 is the second structure diagram of the jacking component of the present invention.
Figure 11:
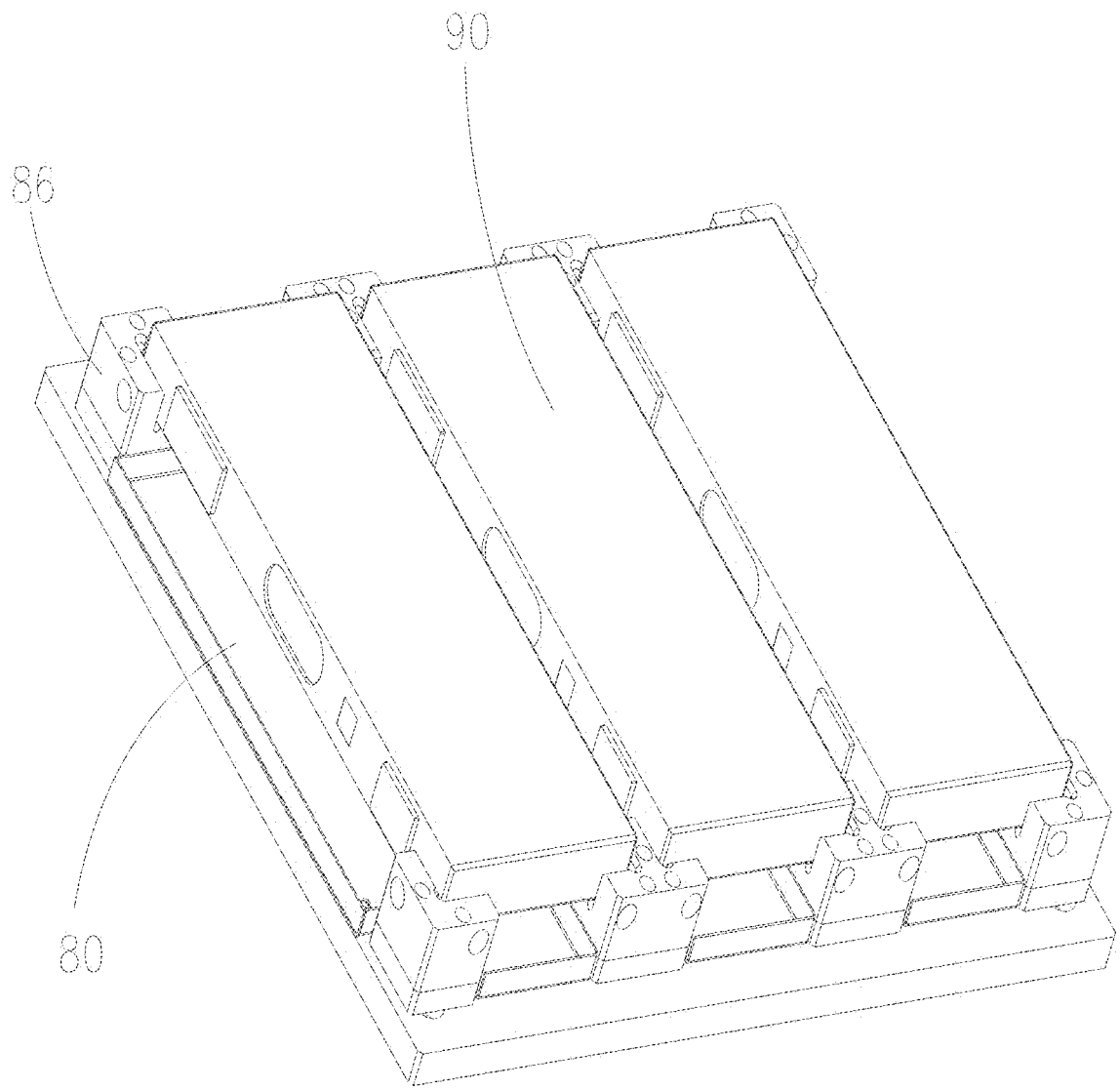
FIG. 11 is a structure diagram of the fixture of the present invention.
Figure 12:
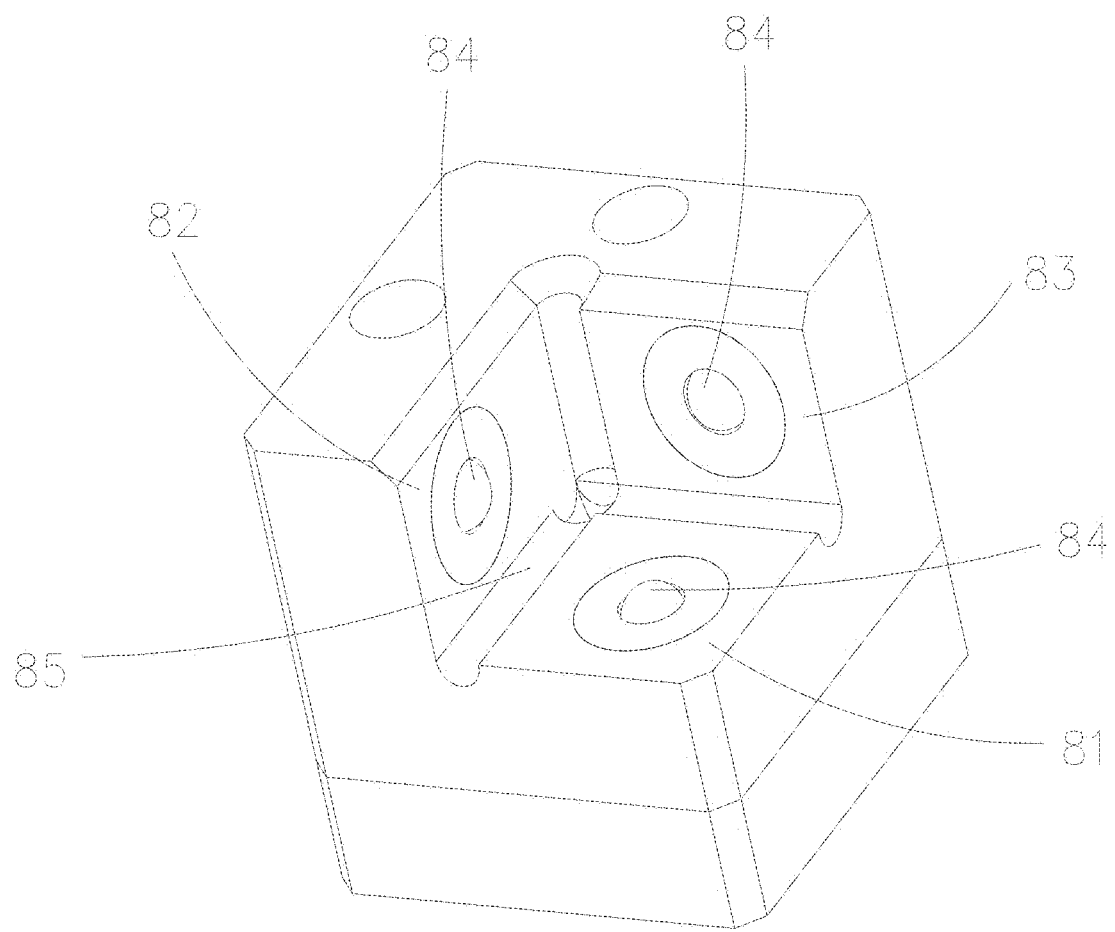
FIG. 12 is a structure diagram of the turning block component of the present invention.

As shown in FIG. 1 to FIG. 12, an automatic multi-surface jet printing method for power lithium battery, comprising: S1: The operator places the power lithium battery to be jet printed on the fixture 80, with the side to be jet printed of power lithium battery facing upwards; S2: The operator places the fixture 80 holding the power lithium battery to be jet printed inside the jet printer from the feeding port; S3: The feeding component disposed at the jet printer transports the fixture 80 to the jet printing station; S4: The jacking component disposed at the jet printer jacks up the fixture 80 located at the jet printing station, and controls the jacking stroke of the fixture 80 along with detecting component, in order to adjust the distance between the surface of power lithium battery to be jet printed and the jet printing component; S5: Jet printing component starts jet printing on the surface of power lithium battery to be jet printed; S6: Feeding component transfers the power lithium battery that has been jet printed to the curing station; S7: The jacking component disposed at jet printer jacks up the fixture 80 located at the curing station, and controls the jacking stroke of fixture 80 along with detecting component, in order to adjust the distance between the power lithium battery and the curing component; S8: Air dry the side of power lithium battery that has been jet printed in S5 using the curing component; S9: Feeding component transfers the power lithium battery that has been air dried to the end of feeding component; S10: The returning component located at the end of feeding component transfers the fixture 80 to the circulating component; S11: Returning component transfers the fixture 80 to the feeding port; S12: The operator retrieves the fixture 80, takes out the power lithium battery from the fixture 80, or flips and clamps the power lithium battery for jet printing again.

The operator clamps, flips, and removes the power lithium battery, places or removes the power lithium battery at the feeding port, and jet prints the power lithium battery using a jet printer, such that the outer surface of power lithium battery is uniformly coated with a layer of insulating material, and the outer shell of power lithium battery is efficiently wrapped with insulation, avoiding the risk of exposed outer shell of power lithium battery during transportation, storage, and use.

The fixture 80 comprises a bottom plate, and a turning block component 86 is provided at the bottom plate for fixing the lithium battery, the turning block component 86 comprises a plurality of blocking members, each of blocking members is provided with an accommodating groove 85 for contacting the lithium battery, the accommodating groove 85 is provided with a first contact surface 81, a second contact surface 82, and a third contact surface 83 that respectively contact different surfaces of the lithium battery, scratch-resistant balls 84 facing the accommodating groove are provided at the first contact surface 81, the second contact surface 82, and the third contact surface 83. For the jet printing of power lithium battery 90, it is necessary to place the power lithium battery 90 on the fixture 80 and, depending on the jet printing surface of power lithium battery 90, the contact surface between the power lithium battery 90 body and the accommodating groove 85 will also be different; for the jet printing on the largest side of power lithium battery 90, the power lithium battery 90 needs to be placed flat, located above the fixture 80 and slowly moved downwards; during the downward movement and placement process, the side of power lithium battery 90 contacts the scratch-resistant ball 84 at the second contact surface 82, and the top surface of power lithium battery 90 contacts the scratch-resistant ball 84 at the third contact surface 83, until the lower surface of power lithium battery 90 comes into contact with the scratch-resistant ball 84 located at the bottom of first contact surface 81 of the accommodating groove 85, and the scratch-resistant ball 84 disposed at the first contact surface 81, second contact surface 82, and third contact surface 83 is used to offset the small displacement friction that may occur between the power lithium battery 90 and the accommodating groove 85 during the movement of the fixture 80, and the same scratch resistance method is also used when the power lithium battery 90 is being take out, thereby avoiding scratches on the outer shell of power lithium battery 90 and improving the yield of power lithium battery 90; the power lithium battery 90 can be fixed and placed in the same way when other surfaces of power lithium battery 90 are being jet printed.

The feeding component 10 comprises at least three feeding racks 11 that are arranged in parallel with each other, a feeding belt 12 and a feeding motor 13 are installed at the feeding racks 11, a material belt groove 14 is also provided at the feeding rack 11, and a feeding drive wheel is provided at the end of material belt groove 14, the two ends of the feeding belt 12 are respectively sleeved on the feeding drive wheel, and the driving shaft end of feeding motor 13 is connected to the feeding drive wheel located at one end of the material belt groove 14. In this embodiment, three feeding racks 11 are arranged in parallel and spaced apart from each other, and the operator can place three sets of fixtures 8080 at the same time, and then drive the feeding drive wheel to rotate through the feeding motor 13, which in turn drives the feeding belt 12 to rotate in the feeding groove, thus feeding materials for the fixture 8080 and for the jet printing of lithium battery with improved jet printing efficiency.

The feeding rack 11 is rectangular in shape, with a hollowed working space in the middle, the working space is provided with a jacking component 60 at both the jet printing and curing stations, the jacking component 60 is used to jack up the external fixture 8080 to be adjacent to the jet printing component 40 or the curing component 50, the material belt groove 14 is located on the side of the feeding rack 11 near the working space, two material belt grooves 14 parallel to each other are disposed on one side of the long edge of feeding rack 11, and a feeding drive roller 15 is connected between the feeding drive wheels located in different material belt grooves 14; the jacking component 60 comprises a jacking installation plate 61, a jacking cylinder 62, and a jacking support plate 63, the jacking installation plate 61 is connected to the feeding rack 11, the feeding support plate 63 is disposed above the jacking installation plate 61, the jacking cylinder 62 is disposed at the jacking installation plate 61 and is connected to the jacking support plate 63, while driving the jacking support plate 63 to move in the vertical direction. Feeding components 60 are provided at both the jet printing and curing stations, and the feeding installation plate 61 is fixedly connected to the feeding rack 11; in this embodiment, the piston rod end of feeding cylinder 62 is connected to the feeding installation plate 61, the feeding support plate 63 is connected to the other end of feeding cylinder 62, and the feeding support plate 63 is pushed back by the feeding cylinder 62, such that the feeding support plate 63 is lifted to jack the fixture 8080 upward within a specific distance of the jet printing component 40 and curing component 50, so that the distance between the fixture 8080 and the jet printing component 40 and curing component 50 is always at the optimal position, facilitating jet printing and air drying of lithium battery.

The returning component 30 comprises at least three parallel returning racks 31 that are located directly below the feeding rack 11, a returning belt 32 and a returning motor 33 are provided at the returning rack 31, and a returning drive wheel is provided at the end of a returning groove 34 at the returning rack 31, and the two ends of the returning belt 32 are respectively sleeved on the returning drive wheel, and the drive shaft end of returning motor 33 is connected to the returning drive wheel located at one end of the returning groove 34; the returning rack 31 is rectangular in shape, with a hollowed support space in the middle, the returning groove 34 is located on the side of feeding rack 11 near the support space, two returning grooves 34 are parallel to the long side of returning rack 31, returning drive roller 35 is connected between the returning drive wheels of different returning grooves 34. In this embodiment, the fixture 8080 is supported by the returning rack 31, and the returning drive wheel is driven by the returning motor 33 to rotate, thereby the returning belt 32 is driven to rotate in the returning groove 34 to return materials for the fixture 8080; in addition, the returning rack 31 disposed below the feeding rack 11 facilitates material returning at the shortest distance and lower cost.

The circulating component 20 comprises a circulating rack 21 and a circulating base 22, and the circulating rack 21 is disposed at the ends of feeding component 10 and returning component 30, and the first circulating driving member that is disposed at circulating rack 21 is connected to the circulating base 22 and drives the circulating base 22 to move back and forth between feeding component 10 and returning component 30; the first circulating driving member comprises a first circulating driving motor 23, a first circulating screw, and a first circulating shaft sleeve sleeved on the first circulating screw, the motor shaft end of the first circulating driving motor 23 is connected to the first circulating screw, the circulating base 22 is connected to the first circulating shaft sleeve, the circulating base 22 is rectangular, and a circulating groove having the same feeding direction as the feeding component 10 is provided at the circulating base 22, the front and rear ends of circulating groove are respectively provided with circulating driving wheels where circulating belts are provided, a second circulating driving motor 25 is also provided at the circulating base 22, and the motor shaft end of second circulating driving motor 25 is connected to the circulating driving wheel; there are two circulating slots, a circulating drive roller 24 is disposed between the circulating drive wheels of different circulating grooves, circulating drive gears are provided around the circulating drive wheels, and the motor shaft end of second circulating drive motor 25 is provided with a circulating main gear; a circulation gear chain 26 is provided between the circulating main gear and the circulating drive gear. The circulating belt is driven by the second circulating motor 25 to rotate clockwise, the fixture 8080 located at the feeding rack 11 is pulled to the feeding rack 22, then the first circulating motor drives the first circulating screw to rotate so that the first circulating shaft sleeve drives circulating base 22 to move downwards to the feeding rack 31, the second circulating motor 25 drives circulating belt to rotate counterclockwise and the fixture 8080 at the feeding rack 22 is delivered to the feeding rack 31, and finally, the first circulating motor drives the first circulating screw to rotate so that the first circulating shaft sleeve drives circulating base 22 to move upwards to the feeding rack 11, and the fixture 8080 is transported cyclically in the same way repeatedly.

The jet printing component 40 comprises a jet printing rack 41, a jet printing base 42, and a jet printing driving member 43, and the jet printing rack 41 is horizontally disposed above the feeding rack 11, and an inkjet head is provided at the jet printing base 42 and faces towards the feeding rack 11, and the jet printing driving member 43 is disposed at the jet printing rack 41 and is connected to the jet printing base 42. In this embodiment, a jet printing drive chain is used as the jet printing drive member 43, and the connection between jet printing drive member 43 and jet printing base 42 drives the jet printing base 42 to move back and forth along the jet printing rack 41, such that the lithium batteries located on different feeding racks 11 are jet printed, and the distance between lithium battery and inkjet printing head is controlled through the jacking component 60, in order to jet print different sides of the lithium battery.

The curing component comprises a curing rack, a curing base, and a curing driving member, the curing rack is horizontally disposed above the feeding component, and a curing irradiation port is provided at the curing base and faces towards the feeding component, and the curing driving member is disposed at the curing rack and is connected to the curing base. In this embodiment, an air drying drive chain is used as the curing drive member 53, and the connection between curing drive member 53 and curing base 52 drives the jet printing base 52 to move back and forth along the curing rack 51, such that the lithium batteries located on different feeding racks 11 are air dried, and the distance between lithium battery and curing irradiation port is controlled through the jacking component 60, in order to air dry different sides of the lithium battery.

The above are only the preferred embodiments of the present invention, and are not intended to limit the present invention. Any equivalent structural transformation made based on the description and accompanying drawings hereof under the concept of present invention, or be directly/indirectly applied in other related technical fields, should fall within scope of patent protection of the present invention.

What is claimed is:

1. An automatic multi-surface jet printing method for a power lithium battery, comprising:
    S1: an operator places the power lithium battery to be jet printed on a fixture, with one side to be jet printed of the power lithium battery facing upwards;
    S2: the operator places the fixture holding the power lithium battery to be jet printed inside a jet printer from a feeding port;
    S3: a feeding component disposed at the jet printer transports the fixture to a jet printing station;
    S4: a jacking component disposed at the jet printer jacks up the fixture located at the jet printing station, and controls a jacking stroke of the fixture along with a detecting component, in order to adjust a distance between a surface of the power lithium battery to be jet printed and a jet printing component;
    S5: the jet printing component starts jet printing on the surface of the power lithium battery to be jet printed;
    S6: the feeding component transfers the power lithium battery that has been jet printed to a curing station;
    S7: the jacking component disposed at the jet printer jacks up the fixture located at the curing station, and controls the jacking stroke of the fixture along with the detecting component, in order to adjust a distance between the power lithium battery and the curing component;

S8: air dry lone side of the power lithium battery that has been jet printed in S5 using the curing component;
S9: the feeding component transfers the power lithium battery that has been air dried to one end of the feeding component;
S10: a returning component located at the end of the feeding component transfers the fixture to a circulating component;
S11: the returning component transfers the fixture to the feeding port;
S12: the operator retrieves the fixture, takes out the power lithium battery from the fixture, or flips and clamps the power lithium battery for jet printing again;
wherein the circulating component comprises a circulating rack and a circulating base, and the circulating rack is disposed at ends of the feeding component and the returning component, and the first circulating driving member that is disposed at the circulating rack is connected to the circulating base and drives the circulating base to move back and forth between the feeding component and the returning component;
wherein the jet printing component comprises a jet printing rack, a jet printing base, and a jet printing driving member, and the jet printing rack is horizontally disposed above the feeding component, and a UV digital inkjet head is provided at the jet printing base and faces towards the feeding component, and the jet printing driving member is disposed at the jet printing rack and is connected to the jet printing base;
wherein the curing component comprises a curing rack, a curing base, and a curing driving member, the curing rack is horizontally disposed above the feeding component, and a curing irradiation port is provided at the curing base and faces towards the feeding component, and the curing driving member is disposed at the curing rack and is connected to the curing base;
wherein the fixture comprises a bottom plate, and a turning block component is provided at the bottom plate for fixing the lithium battery, the turning block component comprises a plurality of blocking members, each of the blocking members is provided with an accommodating groove for contacting the lithium battery, the accommodating groove is provided with a first contact surface, a second contact surface, and a third contact surface that respectively contact different surfaces of the lithium battery, scratch-resistant balls facing the accommodating groove are provided at the first contact surface, the second contact surface, and the third contact surface.

2. The automatic multi-surface jet printing method for a power lithium battery according to claim 1, wherein the feeding component comprises at least three feeding racks that are arranged in parallel with each other, a feeding belt and a feeding motor are installed at the feeding racks, a material belt groove is also provided at the feeding rack, and a feeding drive wheel is provided at one end of the material belt groove, two ends of the feeding belt are respectively sleeved on the feeding drive wheel, and a driving shaft end of the feeding motor is connected to the feeding drive wheel located at one end of the material belt groove.

3. The automatic multi-surface jet printing method for a power lithium battery according to claim 2, wherein the returning component comprises at least three parallel returning racks that are located directly below the feeding rack, a returning belt and a returning motor are provided at the returning rack, and a returning drive wheel is provided at one end of a returning groove at the returning rack, and two ends of the returning belt are respectively sleeved on the returning drive wheel, and a driving shaft end of the returning motor is connected to the returning drive wheel located at one end of the returning groove.

4. The automatic multi-surface jet printing method for a power lithium battery according to claim 1, wherein the first circulating driving member comprises a first circulating driving motor, a first circulating screw, and a first circulating shaft sleeve sleeved on the first circulating screw, a motor shaft end of the first circulating driving motor is connected to the first circulating screw, the circulating base is connected to the first circulating shaft sleeve, the circulating base is rectangular, and a circulating groove having a same feeding direction as the feeding component is provided at the circulating base, front and rear ends of the circulating groove are respectively provided with circulating driving wheels where circulating belts are provided, a second circulating driving motor is also provided at the circulating base, and a motor shaft end of the second circulating driving motor is connected to the circulating driving wheel.

5. The automatic multi-surface jet printing method for a power lithium battery according to claim 1, wherein the jacking component comprises a jacking installation plate, a jacking cylinder, and a jacking support plate, the jacking installation plate is connected to the feeding component, the jacking support plate is disposed above the jacking installation plate, the jacking cylinder is disposed at the jacking installation plate and is connected to the jacking support plate, while driving the jacking support plate to move in a vertical direction.

6. The automatic multi-surface jet printing method for a power lithium battery according to claim 1, wherein the detecting component comprises CCD detection cameras that are respectively disposed above the jet printing station and the curing station for detecting the distance between the power lithium battery and the jet printing component or the curing component.

* * * * *